United States Patent
Carroccia et al.

(10) Patent No.: US 11,279,560 B2
(45) Date of Patent: Mar. 22, 2022

(54) MASONRY TRANSPORT ASSEMBLY

(71) Applicant: On Top Safety, Inc., Cheektowaga, NY (US)

(72) Inventors: John J. Carroccia, Orchard Park, NY (US); Jeffrey L. Murray, Hamburg, NY (US)

(73) Assignee: ON TOP SAFETY, INC., Cheektowaga, NY (US)

( * ) Notice: Subject to any disclaimer, the term of this patent is extended or adjusted under 35 U.S.C. 154(b) by 0 days.

(21) Appl. No.: 16/895,222

(22) Filed: Jun. 8, 2020

(65) Prior Publication Data

US 2021/0380344 A1  Dec. 9, 2021

(51) Int. Cl.
*B65B 9/00* (2006.01)
*B65G 7/12* (2006.01)

(52) U.S. Cl.
CPC ..................... *B65G 7/12* (2013.01)

(58) Field of Classification Search
CPC ............ B65G 7/12; B66C 1/422; E04G 21/16
USPC ..................................... 294/62, 106
See application file for complete search history.

(56) References Cited

U.S. PATENT DOCUMENTS

| | | | | |
|---|---|---|---|---|
| 1,041,949 A | * | 10/1912 | Bandemer | E04G 21/16 294/62 |
| 1,153,269 A | * | 9/1915 | Sturm | E04G 21/16 294/62 |
| 1,364,128 A | * | 1/1921 | Messinger | E04G 21/16 294/62 |
| 1,385,867 A | * | 7/1921 | Fuller | E04G 21/16 294/62 |
| 1,806,956 A | | 8/1923 | Smith | |
| 1,519,160 A | * | 12/1924 | Nedrow | B65G 7/12 294/16 |
| 1,565,075 A | * | 12/1925 | Fassbender | B65G 7/12 294/16 |
| 1,581,077 A | * | 4/1926 | Mosier | E04G 21/162 294/62 |
| 1,755,463 A | | 5/1928 | Waddell | |
| 3,436,112 A | * | 4/1969 | Pasquine | B65G 7/12 294/62 |
| 3,820,837 A | * | 6/1974 | Fredrickson | B65G 7/12 294/16 |

(Continued)

FOREIGN PATENT DOCUMENTS

| | | |
|---|---|---|
| DE | 2532399 | 2/1977 |
| DE | 4017287 | 10/1991 |

(Continued)

*Primary Examiner* — Paul T Chin
(74) *Attorney, Agent, or Firm* — Simpson & Simpson, PLLC

(57) ABSTRACT

A masonry transport assembly for carrying a paver, tile, or quarried stone is disclosed. The masonry transport assembly generally includes a hinged clamping member including a first arm having a first length, a second arm having a second length, a hinge pivotally connecting the first arm and the second arm, a terminal gripping angled end extending from each of the first and second arms and on ends thereof opposite the hinge, a release mechanism secured to at least one of the first arm or the second arm, and, a mounting eyelet connected to at least one of the first arm or the second arm operatively arranged to receive and connect the support member.

18 Claims, 6 Drawing Sheets

(56) References Cited

U.S. PATENT DOCUMENTS

| | | | |
|---|---|---|---|
| 5,794,999 A | 8/1998 | Corsaro | |
| 6,386,608 B1 * | 5/2002 | Eister | B65G 7/12 |
| | | | 294/15 |
| 8,544,909 B2 | 10/2013 | Martin et al. | |
| 2014/0232127 A1 * | 8/2014 | Robertson | E01C 19/52 |
| | | | 294/207 |

FOREIGN PATENT DOCUMENTS

| | | |
|---|---|---|
| DE | 4014942 | 11/1991 |
| EP | 1279780 | 1/2003 |
| FR | 2463735 | 2/1981 |
| GB | 2213088 | 9/1989 |

* cited by examiner

MASONRY TRANSPORT ASSEMBLY

FIELD OF THE INVENTION

The present disclosure generally relates to a masonry transport assembly for transporting large pavers or stone tiles, and, more particularly, to a paver lifting tool.

BACKGROUND OF THE INVENTION

Lifting a plurality of concrete pavers, landscaping tiles, stone tiles, or any other tiles is an extremely demanding physical task—especially in the case of larger roofing tiles or pavers having dimensions that are greater than 1 ft.×1 ft, e.g., 2 ft.×2 ft, which can often require transport and placement by more than one worker. Worker fatigue can build up quickly due to repetitive bending down, lifting up, transporting, and finally, placing pavers in their final positions. As time passes, more materials are moved, increased worker fatigue can lead to less careful movement and muscle strain from the lower back, arms, legs, and neck. Serious strain can not only negatively affect the finished product but has the potential to result in worker injury requiring worker time off in order to fully recover. In many cases, a first-time strain usually leads to repeat occurrences of the injury, putting a burden on production.

Aside from the physical strain of moving such large pavers, placing large pavers properly, where the joints between adjacent pavers may be relatively small, e.g., a 1/4 inch to a 1-inch joint, can be a difficult task. That is, for example, the base where the paver is going to be placed is usually pre-leveled and placing a paver by hand onto its desired location usually requires further adjustment as the worker cannot just drop a paver into place. A hand-placed paver is usually set down by placing one edge on the surface of the base, moving the hands out of the way, and placing the opposite edge down. The hand-place approach seldom keeps the base underneath level as the worker has to place one edge down before setting the other edge, this creates a compacting effect on one side of the paver that is greater than that of the final edge that is placed, un-leveling the base layer. Extra time is spent re-leveling the base and the process leaves the laborer subject to finger injuries when setting and/or attempting to replace or adjust the pavers.

Various attempts have been previously made to address the physical strain on a user when placing bricks, pavers and the like.

In German Patent No. 2,532,399, Holbeck discloses a lifting assembly for paving stones and the like articles by a single user. The assembly comprises two supporting arms that pivot on a handle, and are arranged one behind the other. The two supporting arms extend in line with or at an obtuse angle to each other, and each supporting arm has a gripping jaw at the free end. The handle is fixedly secured to one of the supporting arms and also comprises a footplate that extends over the adjacent arm ends. Holbeck further discloses that the arms can be arranged in two sections to allow for adjustment of their respective length.

Another method is disclosed by O'Brien in U.K. Pat. No. 2,213,088. O'Brien discloses a slab handling apparatus that comprises a support means have a pair of brackets that pivot in order to grip opposite edges of a slab or kerb. Each bracket has an L-shaped end portion. A handle is provided to enable the support means to lift and move a slab. As the handle is raised the L-shaped portions of the brackets frictionally engage the edges of a slab or kerb. O'Brien discloses a handle operatively arranged for use of a single individual and a second embodiment of a handle operatively arranged for use of two individuals.

Yet another method is disclosed by Kastner in French Pat. No. 2,463,735. Kastner discloses a stone grip consisting of a hook plate with a slot operatively arranged to accept a crane hook or lifting bar. The hook plate comprises elongated holes to accept two cranked levers that are fitted at the ends with friction pads. A central beam is also attached to the back of the pads and to the corner bolts, the beam is fitted with a perpendicular holding bar fitted with end handles operatively arranged to be held by two operators.

Although these three patented inventions ostensibly solve certain problems, i.e., moving a brick, paver, or stone, the first two mentioned patents are not particularly configured for purposes of lifting pavers or slabs of greater size and weight typically requiring the efforts of at least two individuals. More specifically, the first two mentioned patents disclose handle apparatuses that are specifically configured for use by a single operator. The finally-mentioned patent, although designed for two operators, has a gripping mechanism that does not allow pavers or slabs to be positioned in close proximity to one another without first removing the transport apparatus. Therefore, there is a long felt need for an apparatus to transport large dimensioned and heavy pavers that can sufficiently grip the large pavers, allows pavers to be finally positioned in close proximity to one another, a structure that retains a substantially open position when the transport assembly is not in use, and employs a handle mechanism that safely keeps the operator's hands away from the clamping mechanism.

SUMMARY OF THE INVENTION

The instant disclosure broadly describes a masonry transport assembly for transporting large pavers or stone tiles, e.g., 2 ft.×2 ft., of the type used for outdoor stone roof decks and the like.

In some aspects, an invention in accordance with the instant disclosure broadly comprises a two (2) person handle that comprises a generally horizontally oriented handle member that is connected to a generally vertically oriented support member that is detachably secured to a hinged clamping member by way of a mounting plate. In some aspects, the hinged clamping member comprises a first arm and a second arm that are pivotably connected by way of a hinge. In some aspects, the mounting plate is secured to the top of one of the two arms. In some aspects, the first arm and second arm are substantially the same length. In some aspects, the terminal ends of the first and second arms opposite from the hinge form an angled end, or gripping end, that is operatively arranged to clamp the opposite sides of a paver/tile. In some aspects, the gripping end is operatively arranged to be relatively thin in its width, e.g., ⅛ inch, allowing the paver/tile to be placed adjacent to another paver/tile to thereby form a joint therebetween of approximately ⅛ of an inch. In some aspects, one or more arms of the hinged clamping member can include a release plate secured to the top surface of the arm, which may be operated by hand or by foot. In some aspects, the release plate can allow a user to apply pressure with their foot to safely release the hinged clamping member from the paver/tile once it has been placed, avoiding the need to bend down to release the first and second arms from the gripping end(s). In some aspects, the interior surfaces of one or more gripping ends can include a friction surface, such as knurling, rubber pads, etc. that allow a paver to be more easily grasped and retained by the gripping arms during transport and placement.

In some aspects, the ends of the first and second arms proximate the hinge and opposite the gripping ends are operatively arranged to abut one another when the transport assembly is not engaged with a paver—this allows the hinge mechanism to only slightly close under the force of gravity thereby maintaining the transport assembly in a substantially open position, which allows a paver/tile to be readily grasped by a user(s) without having to bend down to open the first and second arms in order to grasp a paver/tile.

In some aspects, an invention in accordance with the instant disclosure can comprise a two (2) person handle that includes a substantially horizontally-oriented handle member that is secured to a substantially vertically-oriented support member that is detachably securable to an eyelet secured backbone support member. In some aspects, a hinge is secured to the backbone support member that has two leaves that are connected to a first arm and a second arm. In some aspects, the leaf that is connected to the second arm is also connected to the backbone support member. In some aspects, the leaf that is connected to the first arm is pivotably secured to the backbone support member. In some aspects, the first arm has a length shorter than that of the second arm. In some aspects, both the first and second arms opposite ends from the hinge form an angled end that is operatively arranged to clamp the opposite sides of a paver/tile.

In some further aspects, an invention in accordance with the instant disclosure can comprise a two (2) person handle that comprises a substantially horizontal-oriented handle member that can be connected to a substantially vertically-oriented support member that is detachably securable to an eyelet secured to the backbone support member. In some aspects, a pair of hinges are secured to the backbone support member and each hinge has two leaves that are connected to a first arm and a second arm, respectively. In some aspects, a first leaf of each of the hinges is connected to the backbone support member and a first or second arm, and a second leaf of each of the hinges is connected to the other of the first or second arm. In some aspects, the hinge leaves that are connected to the first and second arms are pivotably secured to the backbone support member. In some aspects, a pair of the first or second arms have a length shorter than that of a pair of the second arms or first arms.

In some aspects, a masonry transport assembly in accordance with the instant disclosure can include an eyelet assembly for securing one end of a chain, cable, or rope thereto. In some aspects, an opposite end of the chain, cable, or rope, for example, may be secured to a carrying bar or like device such that the assembly including the secured pavers/tiles may be transported by a pair of individuals.

It is therefore an object of the instant disclosure to describe a masonry transport assembly of robust nature in order to support heavy weights of pavers/tiles of larger sizes and weights. Due to the weight of the larger pavers/tiles secured thereto, such pavers/tiles generally need to be carried by at least two (2) individuals. That is, given the weight and relative dimensions of the pavers/tiles to be transported, as compared to, for example, much smaller bricks, a single individual would generally be incapable of and/or would find it very difficult or awkward to transport large pavers/tiles using a carrying device specifically configured for use by a single individual and/or a device including only a single hand and/or a single carrying handle.

It is also an objective of the instant disclosure to describe a masonry transport assembly configuration that maintains the transport assembly in a substantially open position when a paver is not secured therein. That is, by securing the first and second arms to hinge leaves such that the respective ends of the first and second arms proximate the hinge abut one another under the force of gravity when a paver/tile is not secured therein, further closing of the hinge can be prevented to thereby maintain the transport assembly in a substantially open position such that a paver or tile can be readily grasped without having to bend over and manually open the first and second arms relative to one another.

It is a further objective of the instant disclosure to describe a masonry transport assembly that allows pavers or tiles to be readily positioned in close proximity to one another minimizing the need or requirement for hand adjustment. That is, by providing relatively thin gripping ends, pavers and tiles can be placed in close proximity to another without disengaging the transport assembly until a final position is obtained.

These and other objects and advantages will be readily appreciable from the following description of aspects of the invention and the accompanying drawings and claims.

BRIEF DESCRIPTION OF THE DRAWINGS

The nature and mode of the operation of an invention in accordance with the instant disclosure will now be more fully described in the following detailed description taken with the accompanying drawing figures, in which.

DETAILED DESCRIPTION OF EMBODIMENTS OF THE INVENTION

The terminology used herein is for the purpose of describing particular aspects only and is not intended to be limiting of any claimed invention.

As used herein, the term "and/or" includes any and all combinations of one or more of the associated listed items. As used herein, the singular forms "a," "an," and "the" are intended to include the plural forms as well as the singular forms.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of aspects, embodiments, techniques or steps may be disclosed. Each of these has individual benefit and each can also be used in conjunction with one or more, or in some cases all, of the other disclosed aspects, embodiments, techniques or steps.

Accordingly, for the sake of clarity, this description will refrain from discussing and/or repeating all possible combinations of the individual aspects, embodiments, techniques, or steps in an unnecessary fashion.

Nevertheless, the specification and claims should be read with the understanding that such combinations are entirely within the scope of the invention and the claims.

In the following description, for purposes of explanation, numerous specific details are set forth in order to provide a thorough understanding of an invention in accordance with the instant disclosure. It will be evident, however, to one skilled in the art, that the an invention in accordance with the instant disclosure may be practiced without these specific details.

The present disclosure is to be considered as an exemplification of the invention and is not intended to limit the invention to the specific aspects or embodiments illustrated by the figures or description below. The invention described herein may be of any suitable material such as metal, hard polymers, or a combination of metal and plastic materials to reduce weight.

Figure 1:
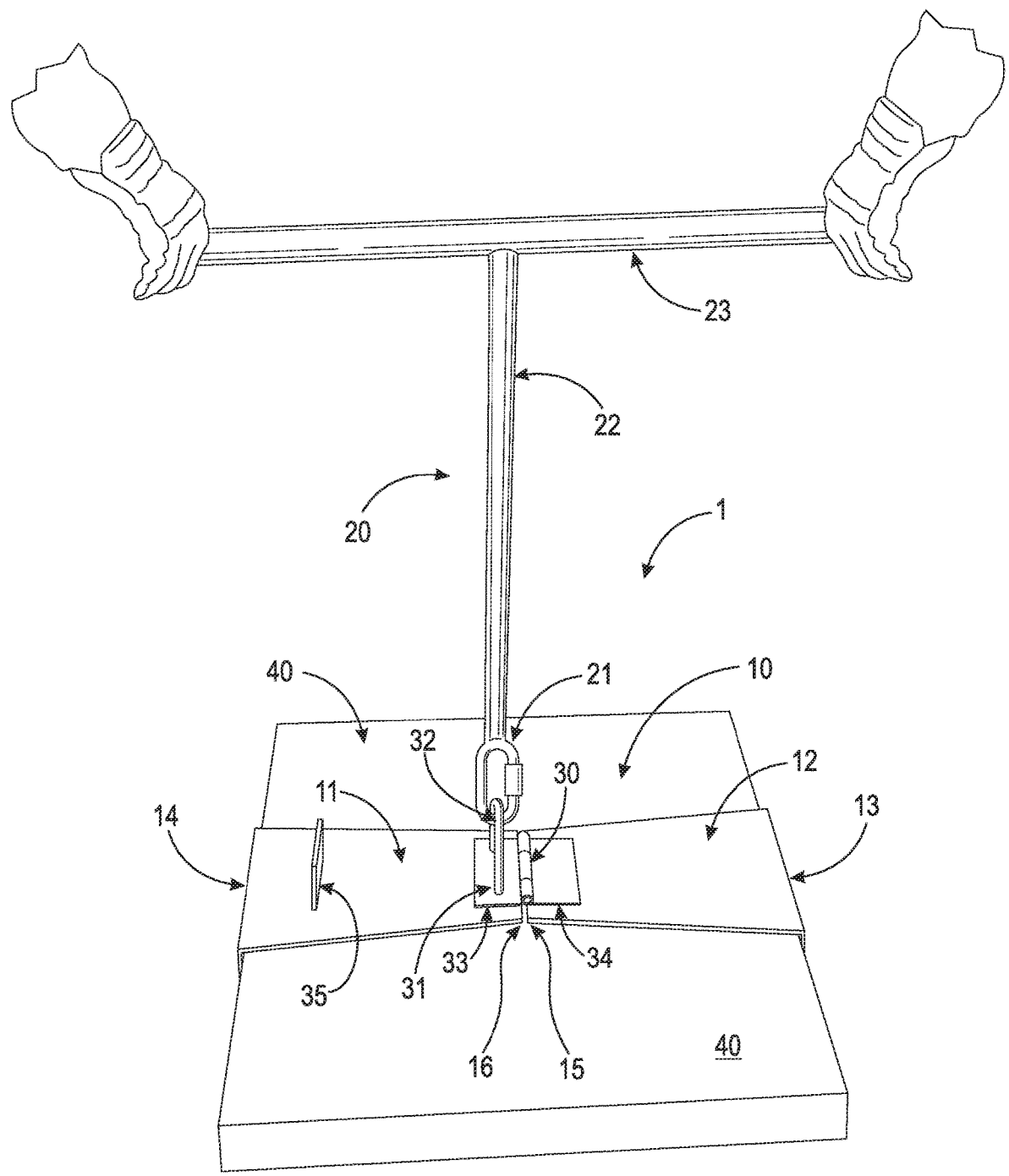
FIG. 1 is a perspective view of a masonry transport assembly in accordance with the instant disclosure showing a masonry transport assembly engaged with a large stone paver or tile.

Referring to the drawings in which FIG. 1 is a perspective view of a masonry transport assembly in accordance with the instant disclosure. As may be appreciated from FIG. 1, masonry transport assembly 1 is shown as generally comprising arm assembly 10 and carrying assembly 20.

Figure 2:
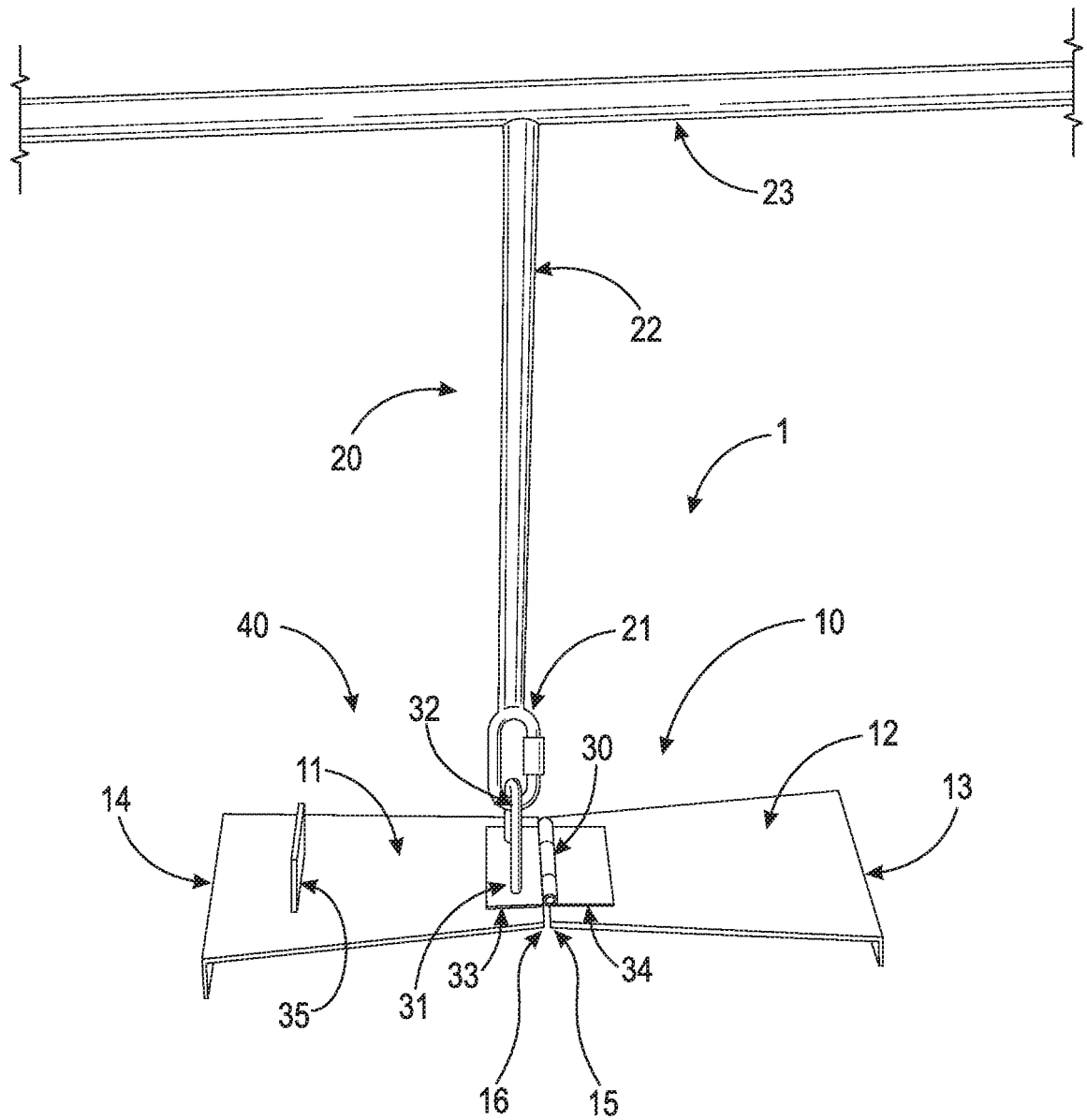
FIG. 2 is a perspective view of a masonry transport assembly in accordance with the instant disclosure showing a masonry transport assembly with no engaged large stone paver or tile.
Figure 3A:
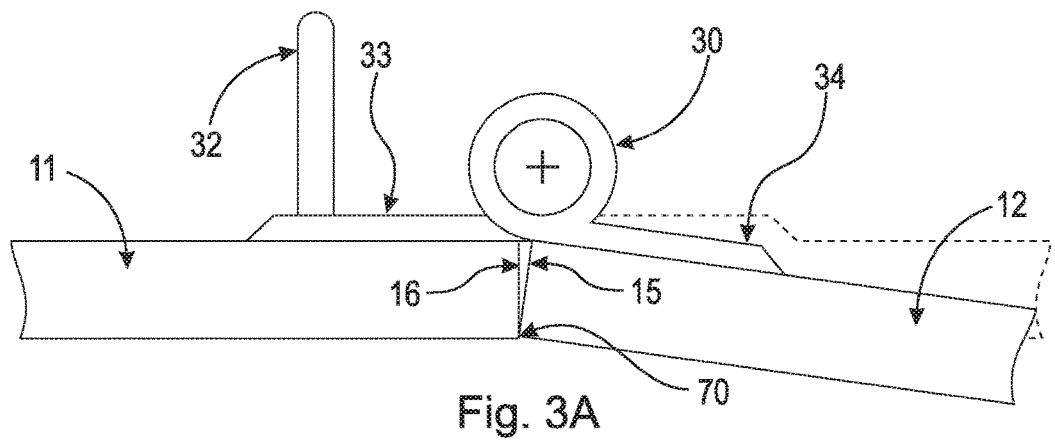
FIG. 3A is a partial front side view of a masonry transport assembly in accordance with the instant disclosure showing the range of motion of the hinge assembly and arms and showing abutment of the arms with one another when no large stone or paver is engaged.
Figure 3B:
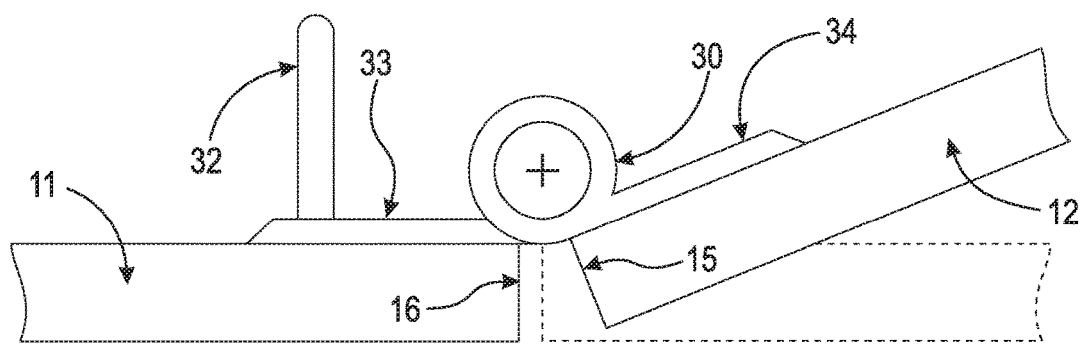
FIG. 3B is a partial front side view of a masonry transport assembly in accordance with the instant disclosure showing the range of motion of the hinge assembly and arms when no large stone or paver is engaged and also showing the ability of the arms to pivot more than 180°.
Figure 3C:
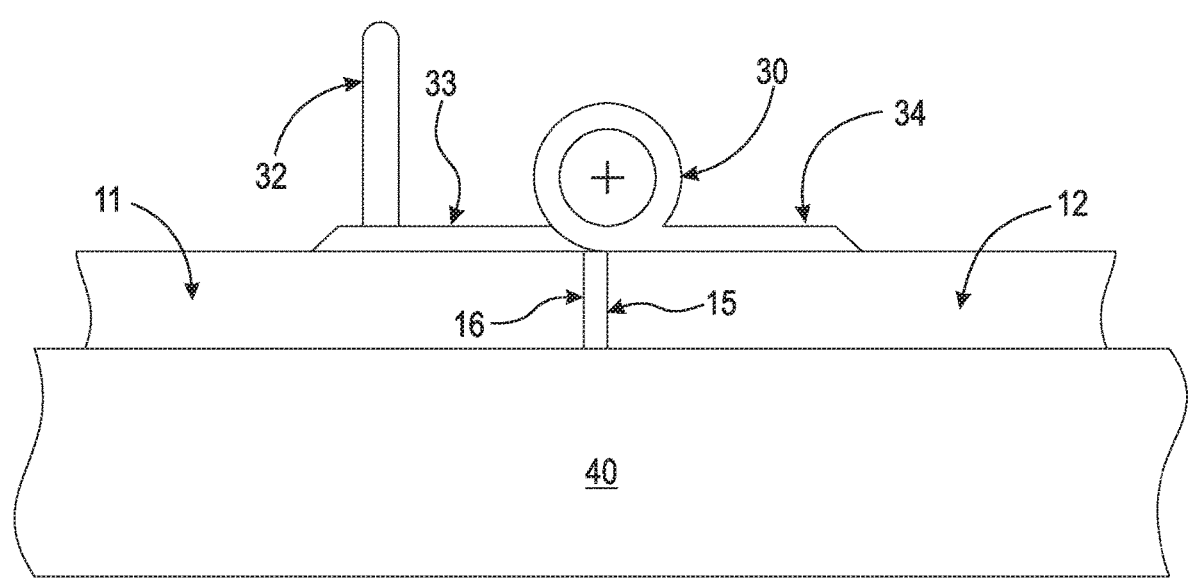
FIG. 3C is a partial front side view of a masonry transport assembly in accordance with the instant disclosure showing the range of motion of the hinge assembly and arms when a large stone or paver is engaged.

As shown in FIGS. 1-3C, arm assembly 10 generally comprises first arm member 11 and second arm member 12. First arm member 11 has first gripping end 14 arranged opposite and distal of first hinge end 16. Second arm member 12 has second gripping end 13 arranged and opposite and distal of second hinge end 15. First arm member 11 and second arm member 12 are pivotally secured relative to one another by hinge 30. Hinge 30 comprises first leaf 33 and second leaf 34, which are shown as being connected and fixedly secured to the top surface of first arm member 11 and second arm member 12, for example, as by welding, proximate first hinge end 16 and second hinge end 15, respectively, such that the space or joint between the first hinge end 16 and second hinge end 15 is offset relative to the knuckle or hub of hinge 30. As shown in the figures, the first arm member 11 is shown as further comprising release plate 35 fixedly secured to top surface thereof, for example, as by welding. Release member 35 may be fixedly secured to second arm member 12 or provided on both the first arm member 11 and the second arm member 12. As shown in FIGS. 3A-3C, while an offset joint is shown as being formed between first arm member 11 and second arm member 12, first and second arm members 11 and 12 may be attached to hinge 30 such that no offset is present. While not shown, gripping ends 15 and 16 may be configured to be lockably adjustable, such as by means of one or more ball/detent mechanisms, relative to their respective arms so as to accommodate pavers/tiles 40 of various size.

On either first leaf 33 or second leaf 34, eyelet 32 can be fixedly secured to a top surface thereof, for example, as by welding. Eyelet 32 is operatively arranged to accept carrying assembly 20 fastener loop 21, to connect arm assembly 10 to carrying assembly 20.

Carrying assembly 20 comprises fastener loop 21 at the distal end of pole 22 which is fixedly secured to handle 23, for example, as by welding. Handle 23 is operatively arranged to be held by first operator 100 and second operator 101 at opposite ends. Handle 23, in a preferred embodiment, is a length greater than that of arm assembly 10 to reasonably place first operator 100 and second operator 101 at a distance where an engaged paver/tile 40 by arm assembly 10 would not contact, nor hinder the lower extremities of a pair of operators transporting paver/tile 40. Pole 22, in a preferred embodiment, is a suitable vertical length that a pair of operators may hold handle 23 with their arms at their side while still lifting paver/tile 40 off the ground for transport.

FIG. 2 is a perspective view of masonry transport assembly 1 without engaging paver/tile 40 for moving. Without paver/tile 40, gripping ends of the arms of arm assembly 10 can be viewed. First arm 11 comprises first gripping end 14 arranged opposite from first hinge end 16. Second arm 12 comprises second gripping end 13 arranged opposite from second hinge end 15. Gripping ends 13 and 14 are fixedly secured to first arm 11 and second arm 12. Gripping ends 13 and 14 form a generally downward facing right angle and may comprise additional components, e.g., rubber, a textured surface, knurling, or other gripping material, on the inner face that grips paver/tile 40 to increase the frictional engagement thereof. The open position of arm assembly 10 is maintained by the abutment of hinge ends 15 and 16 with one another, illustrated in FIG. 3A and discussed further infra.

FIGS. 3A-3C are a side view of the hinge mechanism. FIGS. 3A-3C also show the abutment of the that prevent the assembly from fully closing when not engaging paver/tile 40 and are common to all the embodiments of the invention disclosed herein. By allowing the arms 11 and 12 to remain in a substantially open position when no paver/tile 40 is engaged, a paver/tile 40 may be readily gripped without having to manually open the arms 11 and 12, for example, by hand.

Referring now to FIG. 3A, the following description should be read in view of FIGS. 1-3C, and FIGS. 4-6, discussed further infra. Hinge 30 comprises first leaf 33 and second leaf 34. First leaf 33 is secured to the top surface of first arm 11. Second leaf 34 is secured to the top surface of second arm 12. FIG. 3A shows arm assembly without paver/tile 40 maintaining a substantially open position. First hinge end 16 of first arm 11 and second hinge end 15 of second arm 12 form abutment 70 from contacting both respective hinge ends. Abutment 70 prevents first arm 11 from closing further, allowing first arm 11 and second arm 12 to be easily engaged to paver/tile 40. Without first hinge end 16 and second hinge end 15, first arm 11 would close further, requiring an operator to physically lift or rotate first arm 11 relative to hinge 30 to engage paver/tile 40.

Directing to FIG. 3B, the following description should be read in view of FIGS. 1-3C, and FIGS. 4-6, discussed further infra. FIG. 3B is a side view of hinge 30 in an open position ready to engage paver/tile 40. First arm 11 or second arm 12 may be rotationally pivoted about hinge 30 in the vertical direction to open the carrying assembly.

Referring to FIG. 3C, the following description should be read in view of FIGS. 1-3C, and FIGS. 4-6, discussed further infra. FIG. 3C is a side view of hinge 30 in an open position engaging paver/tile 40 in the same fashion as viewed in FIGS. 1 and 4. When hinge 30 is in an open positioned, first hinge end 15 and second hinge end 16 form a void between the respective ends.

Figure 4:
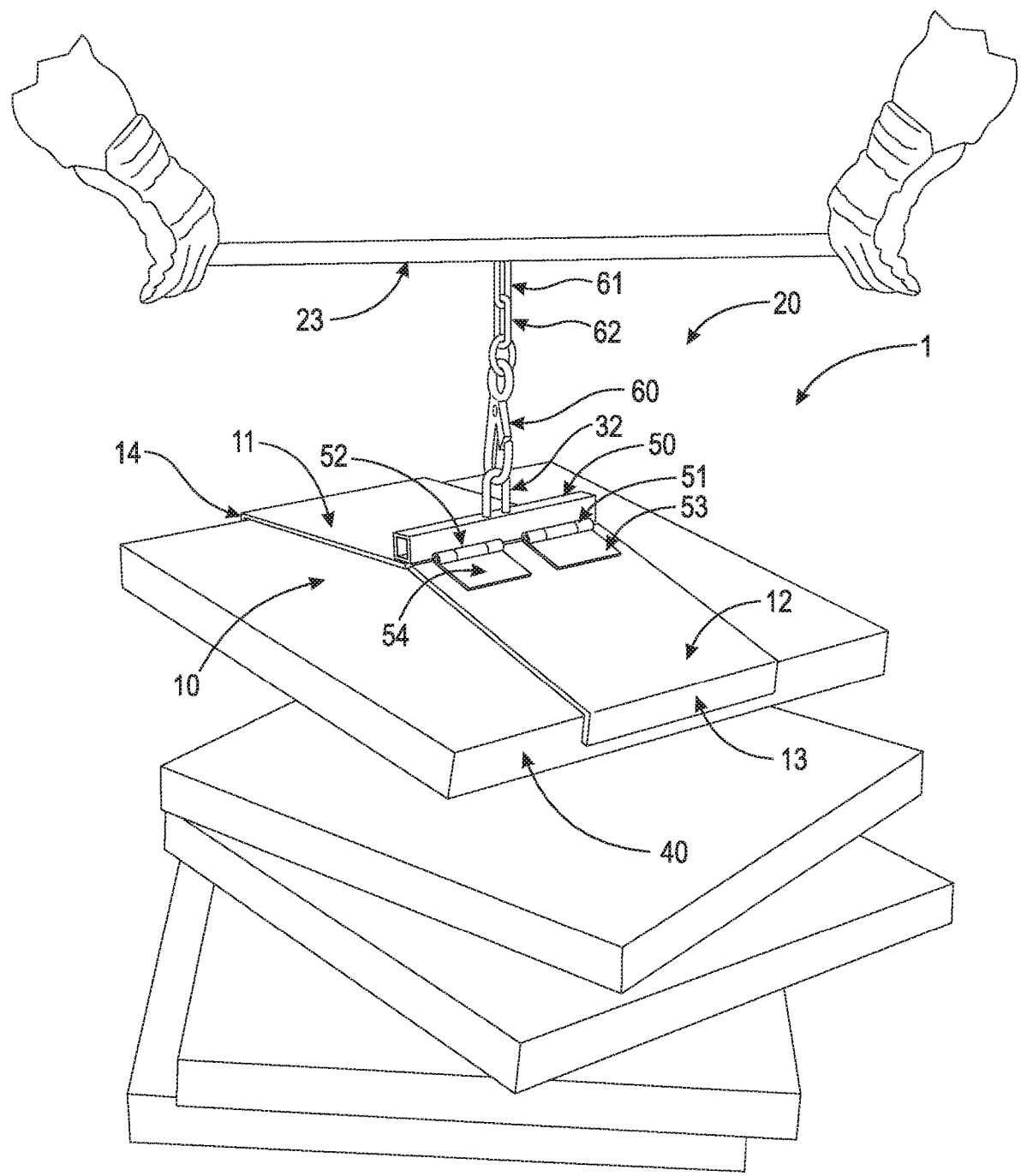
FIG. 4 is a perspective view of a further masonry transport assembly including a so-called backbone in accordance with the instant disclosure showing transport by two individuals.

FIG. 4 is a perspective view of an alternative embodiment of masonry transport assembly in accordance with the instant disclosure. As may be appreciated from FIG. 4, masonry transport assembly 1 is shown as generally comprising arm assembly 10 and carrying assembly 20. Arm assembly 10 generally comprises first arm member 11 and second arm member 12. First arm member 11 has gripping end 14 arranged opposite and distal of backbone 50. Second arm member 12 has gripping end 13 arranged opposite and distal of first backbone hinge 51 and second backbone hinge 52. First arm member 11 is statically secured to the distal surface of backbone 50. On the opposite side surface of backbone 50 relative to first arm member 11, first backbone hinge 51 and second backbone hinge 52 are secured to backbone 50. First backbone hinge 51 and second backbone hinge 52 comprises first backbone hinge leaf 53 and second backbone hinge leaf 54 respectively, which are shown as being fixedly secured to the top surface of second arm member 12. It should be appreciated that first arm member 11 and second arm member 12 form an abutment opposite of first gripping end 14 and second gripping end 13 when arm assembly 10 is not engaging paver/tile 40 as shown in FIG. 3A and discussed supra. Respectively, it should also be appreciated that when arm assembly 10 is engaging paver/tile 40 that a space or joint between the ends of first arm 11 and second arm 12, opposite first gripping end 14 and second gripping end 13, and may be offset relative to the knuckle or hub of hinge 30 or centered relative to the knuckle or hub of hinge 30. It should be further appreciated that the first alternative embodiment shown in FIG. 4 may or may not include release plate 35 fixedly secured to first arm member 11 as shown in FIGS. 1 and 2 and discussed supra.

Backbone 50 further comprises eyelet 32 secured to a top surface thereof. Eyelet 32 is operatively arranged to accept an alternative embodiment of carrying assembly 20 handle clip 60, shown in FIG. 4, to connect arm assembly 10 to carrying assembly 20.

An embodiment of carrying assembly 20, shown in FIG. 4, may comprise handle clip 60 secured to handle chain 62 at the distal end which is connected to handle by handle fastener 61. Handle fastener 61 is fixedly secured to handle 23. Handle 23 is operatively arranged to be held by first operator 100 and second operator 101 at opposite ends. Handle 23, in an alternative embodiment of carrying assembly 20, is a length greater than that of arm assembly 10 to reasonably place first operator 100 and second operator 101 at a distance where an engaged paver/tile 40 by arm assembly 10 would not contact, nor hinder the lower extremities of a pair of operators transporting paver/tile 40. Handle chain 62, in a an alternative embodiment of carrying assembly 20, is a suitable vertical length that a pair of operators may hold handle 23 with their arms at their side while still lifting paver/tile 40 off the ground for transport.

It should also be appreciated that handle assembly 20 as shown in FIGS. 1 and 2, described supra, may be used in alternate to handle assembly 20 as shown in FIG. 4 and described above.

Figure 5:
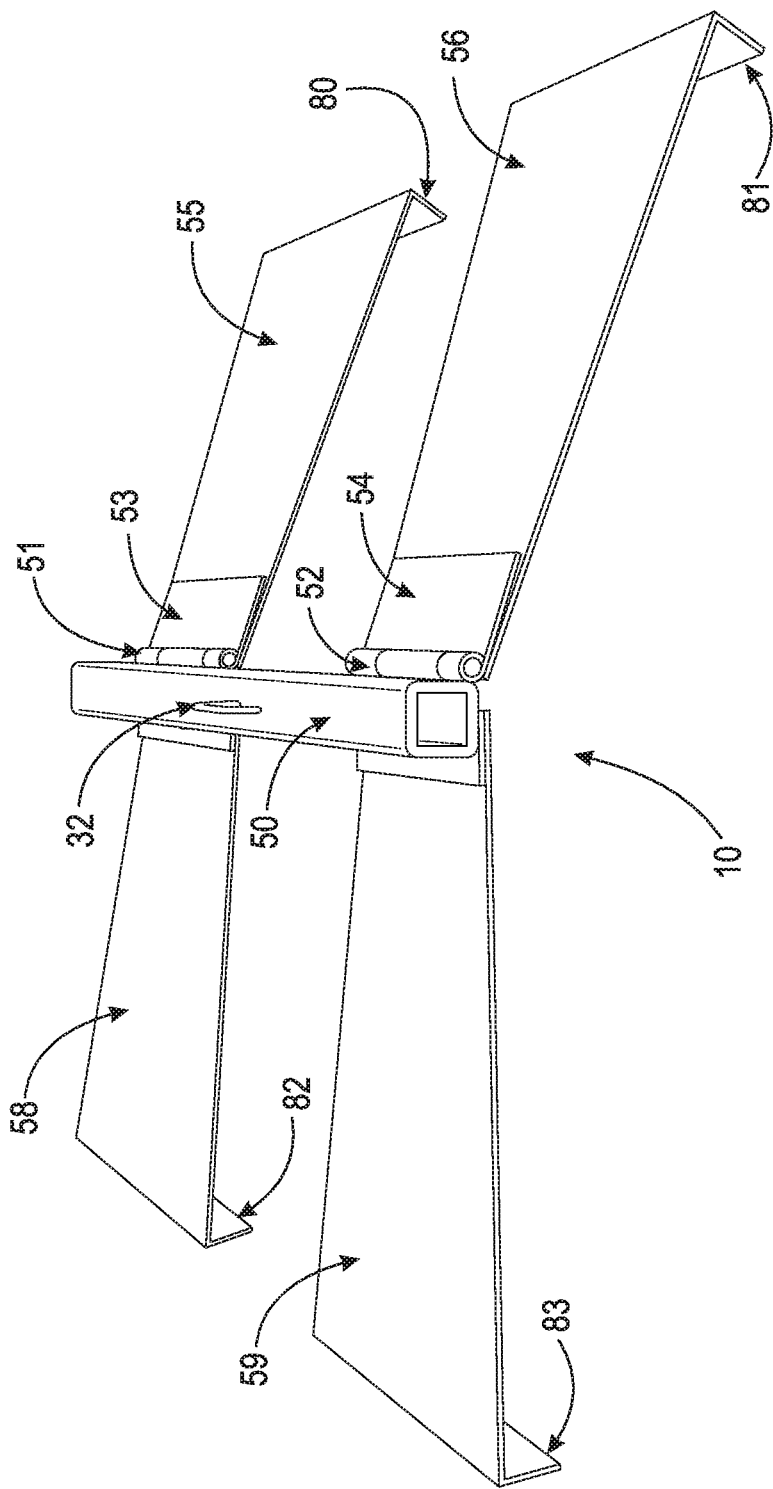
FIG. 5 is a perspective front side view of still a further masonry transport assembly in accordance with the instant disclosure showing a so-called backbone and a pair of carrying devices connected by the backbone.

FIG. 5 is a perspective view of a further embodiment of masonry transport assembly in accordance with the instant disclosure. As may be appreciated from FIG. 5, masonry transport assembly is shown as generally comprising arm assembly 10 and may include either carrying assembly embodiment in view of FIGS. 1-2 or FIG. 4, discussed supra. Arm assembly 10 generally comprises backbone 50, first arm member 55, second arm member 56, third arm member 58, and fourth arm member 59. First arm member 55 has first gripping end 80 arranged opposite and distal of backbone 50. Second arm member 56 has second gripping end 81 arranged opposite and distal of backbone 50. Third arm member 58 has third gripping end 82 arranged opposite and distal of backbone 50. Fourth arm member 59 has fourth gripping end 83 arranged opposite and distal of backbone 50. First arm member 55 is secured to the distal surface of first backbone hinge leaf 53, rotatably secured to first backbone hinge 51. Second arm member 56 is secured to the distal surface of second backbone hinge leaf 54, rotatably secured to second backbone hinge 52. Third arm member 58 and fourth arm member 59 are secured to the distal surface of backbone 50.

It should be appreciated that first arm member 55 and third arm member 58, second arm member 56 and fourth arm member 59, respectively both form an abutment opposite of arm members respective gripping ends when arm assembly 10 is not engaging a paver/tile as shown in FIG. 3A and discussed supra. It should also be appreciated that when arm assembly 10 in FIG. 4 is engaging a paver/tile that a space or joint between the ends of first arm member 55 and third arm member 58, second arm member 56 and fourth arm member 59, opposite their respective gripping ends, and may be offset relative to the knuckle or hub of first backbone hinge 51 and second backbone hinge 52, or centered relative to the knuckle of first backbone hinge 51 and second backbone hinge 52. It should be further appreciated that the embodiment shown in FIG. 5 may or may not include release plate 35, shown in FIGS. 1 and 2, fixedly secured to either, third arm member 58 or fourth arm member 59 or both third arm member 58 and fourth arm member 59.

Backbone 50 further comprises eyelet 32 secured to a top surface thereof. Eyelet 32 is operatively arranged to accept either embodiment of carrying assembly 20 shown in FIGS. 1 and 2, or FIG. 4.

Figure 6:
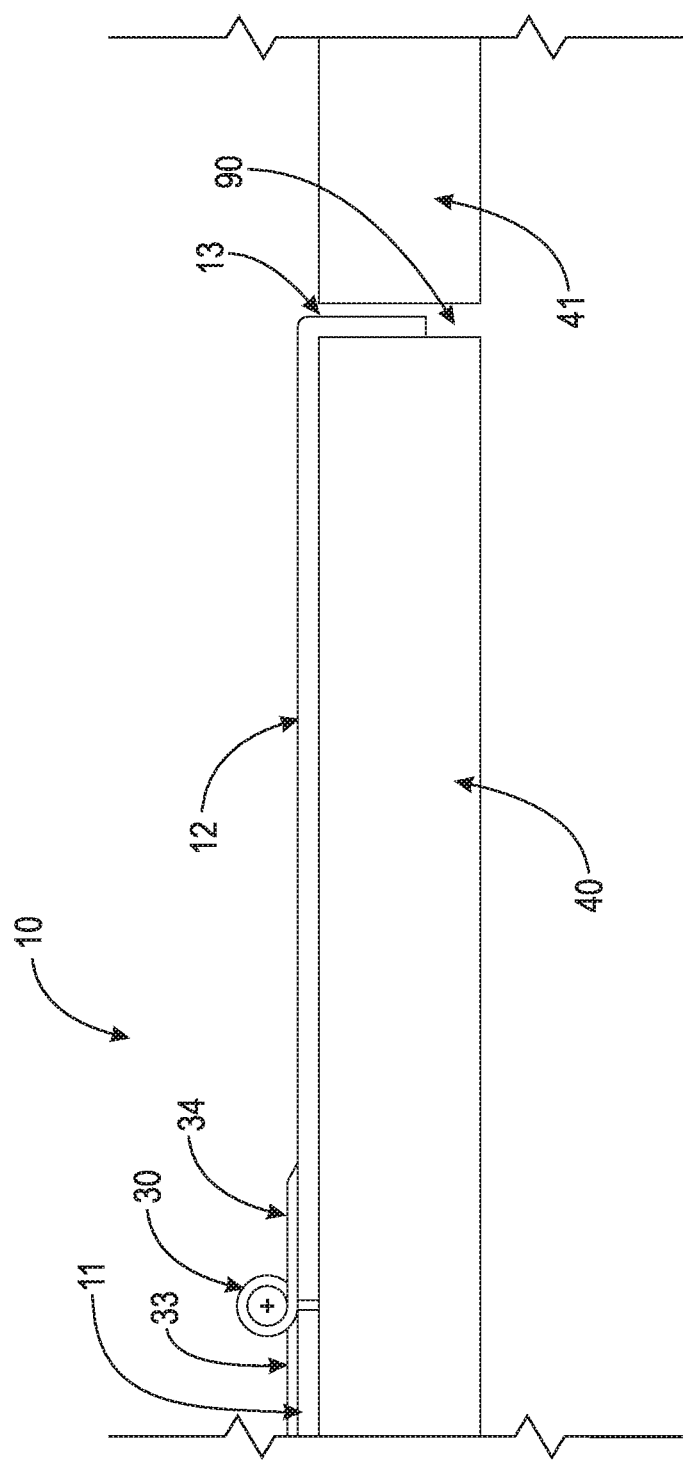
FIG. 6 is a partial front side of masonry transport assembly in accordance with the instant disclosure showing that a gripping arm is capable of fitting between a joint formed between two stone pavers/tiles and the ability to place/reposition a stone paver/tile closely to another adjacent stone paver/tile.

FIG. 6 is a partial view of the arm assembly 10 engaging paver/tile 40 showing that the masonry transport assembly can be used to precisely adjacently place an engaged tile/paver 40 in close proximity to a previously placed second paver/tile 41. That is, gripping ends of the first and second are of a thickness/thinness that allow the gripping ends to be received within a joint formed between a pair of tiles/pavers, for example, such that paver/tiles may be placed in close proximity with one another during placement, or such that the gripping ends may be received within a joint between pavers/tiles to move or reposition a previously placed paver/tile. In some aspects, for example, gripping end 13, for example, may be a thickness between ⅛ and ¼ inches in order to minimize the size of gap 90 formed by placing paver/tile 40 and second paver/tile 41.

Finally, in view of the environment that that masonry transport assembly is utilized, it is generally fabricated from robust and rigid materials that are capable of supporting heavy loads, operating in harsh environments, withstanding wear from repetitive use, and providing a long useful life. To this end, materials comprising the various components of the masonry transport assembly can include, but are not limited to: iron, steel, aluminum, reinforced fiberglass, carbon fiber and combinations thereof of sufficient thickness based on the material utilized, e.g., gripping end and arm thickness can be ¼ inch in the case of steel. Other components, for example, gripping ends and handles may include resilient members for gripping items to be transported and/or providing user comfort.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1—masonry transport assembly
10—arm assembly
11—first arm member
12—second arm member
13—second gripping end
14—first gripping end
15—second hinge end
16—first hinge end
20—carrying assembly
21—fastener loop
22—pole
23—handle
30—hinge
31—mounting plate
32—eyelet
33—first leaf
34—second leaf
35—release plate
40—paver/tile
41—second paver/tile
50—backbone assembly
51—first backbone hinge
52—second backbone hinge
53—first backbone hinge leaf
54—second backbone hinge leaf
55—first arm member
56—second arm member
58—third arm member
59—fourth arm member
60—handle clip
61—handle fastener
62—handle chain
70—abutment
80—first gripping end
81—second gripping end
82—third gripping end
83—fourth gripping end
90—narrow gap
100—first operator
101—second operator

The invention claimed is:

1. A masonry transport assembly configured to carry a paver, tile, or quarried stone, the masonry transport assembly comprising:
   a hinged clamping member, the hinged clamping member comprising:
      a first arm having a first length;
      a second arm having a second length;
      a hinge pivotally connecting the first arm and the second arm;
      a terminal gripping angled end extending from each of the first and second arms and on ends thereof opposite the hinge;
      a release mechanism secured to at least one of the first arm or the second arm; and
      a mounting eyelet connected to at least one of the first arm or the second arm, the mounting eyelet operatively arranged to receive and connect the support member,
      wherein the first and second arms are connected to the hinge assembly such that a void is formed between the first arm and the second arm at the hinge ends thereof, and,
      wherein a distance between the hinge ends of the first arm and the second arm is of a length such that the hinge ends of the first arm and the second arm abut one another and maintain the clamping member in a substantially open position under the force of gravity when the clamping member is not engaged with a workpiece.

2. The masonry transport assembly of claim 1, wherein the void formed between the first arm and the second arm at hinge ends thereof is centrally disposed relative to a hub of the hinge.

3. The masonry transport assembly of claim 1, wherein the void formed between the first arm and the second arm at hinge ends thereof is disposed such that it is offset relative to a hub of the hinge.

4. The masonry transport assembly of claim 3, wherein the void is disposed on a side of the hinge hub toward the first or second arm having the smaller length or the greater length.

5. The masonry transport assembly of claim 4, wherein the release mechanism is disposed on the first or second arm having the smaller length.

6. The masonry transport assembly of claim 4, wherein the eyelet is disposed on the first or second arm having the smaller length.

7. The masonry transport assembly of claim 1, wherein a width of the terminal gripping ends is such that the terminal gripping ends are capable of being received within a joint formed between a pair of workpieces.

8. The masonry transport assembly of claim 7, wherein the width of the terminal gripping ends is between 1/8 and ¼ inches.

9. The masonry transport assembly of claim 7, wherein the terminal gripping ends each include a friction surface disposed on an inner side thereof that has a coefficient of friction greater than that of the terminal gripping end itself.

10. The masonry transport assembly of claim 9, wherein the friction surface comprises at least one of knurling, or a polymeric material secured thereto.

11. The masonry transport assembly of claim 1, wherein the mounting eyelet is configured to receive a support member connected to a carrying handle.

12. The masonry transport assembly of claim 11, wherein the support member is formed of a rigid material that and extends between the eyelet and the carrying handle.

13. The masonry transport assembly of claim 12, wherein the support member is connected to the carrying handle such that it is substantially perpendicularly oriented relative thereto.

14. The masonry transport assembly of claim 11, wherein the support member is formed of a non-rigid material that extends between the eyelet and the carrying handle.

15. The masonry transport assembly of claim 1, wherein the first length and the second length are the same.

16. The masonry transport assembly of claim 1, wherein the first length is smaller than the second length or the second length is smaller than the first length.

17. A masonry transport assembly configured to carry a paver, tile, or quarried stone, the carrying device comprising:
at least one hinged clamping member, the hinged clamping member comprising:
a first arm having a first length;
a second arm having a second length;
a hinge pivotally connecting the first arm and the second arm;
a terminal gripping angled end extending from each of the first and second arms and on ends thereof opposite the hinge;
a backbone member connected to the hinge;
a release mechanism secured to at least one of the first arm or the second arm; and,
a mounting eyelet connected to the backbone member, the mounting eyelet operatively arranged to receive and connect the support member.

18. The masonry transport assembly of claim 17 comprising at least two hinged clamping members connected to each other via the backbone member.

* * * * *